United States Patent
Lemieux (10) Patent No.: US 7,227,888 B2
(45) Date of Patent: Jun. 5, 2007

(54) TESTING LOOPS FOR CHANNEL CODECS

(75) Inventor: Berthier Lemieux, Tampere (FI)

(73) Assignee: Nokia Corporation, Espoo (FI)

( * ) Notice: Subject to any disclaimer, the term of this patent is extended or adjusted under 35 U.S.C. 154(b) by 625 days.

(21) Appl. No.: 10/099,627

(22) Filed: Mar. 15, 2002

(65) Prior Publication Data

US 2002/0177436 A1   Nov. 28, 2002

(30) Foreign Application Priority Data

Mar. 16, 2001   (FI)   .................................. 20010533

(51) Int. Cl.
*H04L 5/16* (2006.01)
(52) U.S. Cl. ..................................... 375/221
(58) Field of Classification Search ................ 375/224, 375/225, 226, 227, 228; 370/241, 247, 248, 370/249, 251, 252; 455/226.1
See application file for complete search history.

(56) References Cited

U.S. PATENT DOCUMENTS

| | | | |
|---|---|---|---|
| 6,205,130 B1 * | 3/2001 | DeJaco | 370/335 |
| 6,240,282 B1 * | 5/2001 | Kleider et al. | 455/226.1 |
| 6,308,065 B1 * | 10/2001 | Molinari et al. | 455/424 |
| 6,493,665 B1 * | 12/2002 | Su et al. | 704/230 |
| 6,504,881 B1 * | 1/2003 | Kim | 375/341 |
| 6,631,122 B1 * | 10/2003 | Arunachalam et al. | 370/332 |
| 2001/0053971 A1 * | 12/2001 | Demetrescu et al. | 704/201 |

FOREIGN PATENT DOCUMENTS

| | | |
|---|---|---|
| WO | WO 99/63764 | 12/1999 |
| WO | WO 01/52467 A1 | 7/2001 |
| WO | WO 01/76123 A1 | 10/2001 |

OTHER PUBLICATIONS

3GPP2 S.R0014 Tandem Free Operation (Stage 1) Version 1.0, Dec. 13, 1999, p. 5-9.*
Patent Abstracts of Japan Publication No. 01-158862.

(Continued)

*Primary Examiner*—Khanh Tran
*Assistant Examiner*—Sam K. Ahn
(74) *Attorney, Agent, or Firm*—Perman & Green, LLP (57) ABSTRACT

A method for measuring the performance of decoding in a telecommunication system comprising a decoder and a testing apparatus for supplying test data to the decoder. A test data comprising channel coded speech parameters and an inband data field in a frame format is generated in the testing apparatus and transmitted to the decoder for decoding. The decoder extracts at least a part of the inband data field from the decoded test data and transmits at least the part of the inband data field back to the testing apparatus. The performance of decoding is measured by comparing the transmitted inband data field and the received inband data field in the test apparatus.

13 Claims, 4 Drawing Sheets

OTHER PUBLICATIONS

ETSI TS 100 939 v7.3.0, "Digital Cellular Telecommunications System (Phase 2+); Mobile Radio Interface Signalling Layer 3; General Aspects (GSM 04.07 version 7.3.0)", 1998, relevant pages.
ETSI TS 101 293 v8.1.0, "Digital Cellular Telecommunications System (Phase 2+); Individual Equipment Type Requirements And Interworking; Special Conformance Testing Functions (GSM 04.14 version 8.1.0)", 1999.

3GPP TS 05.05 v8.7.1, "3rd Generation Partnership Project; Technical Specification Group GERAN; Digital Cellular Telecommunications System (Phase 2+); Radio Transmission And Reception", 1999.
Korean Patent Laid-Open Gazette No. 1998-078749, Published Nov. 25, 1998.

* cited by examiner

TESTING LOOPS FOR CHANNEL CODECS

The invention relates to a method for measuring the performance of decoding in a telecommunication system.

In wireless digital telecommunication, the analog speech information has to be encoded into digital form and then secured by channel coding before transmission to ensure adequate voice quality, when receiving the signal. For example, in traditional GSM speech coding, speech codecs have had a fixed rate. There has been two full-rate speech codecs and one half-rate speech codec in use in the GSM system. The full-rate speech codecs have the output bit rate of either 13 or 12.2 kbit/s, whereas the half-rate speech codec delivers the output bit rate of 5.6 kbit/s. These output bits representing the encoded speech parameters are fed into the channel coder. The channel coding is the set of functions responsible for adding redundancy to the information sequence. The coding is usually performed on a fixed number of input bits. The output bit rate of the channel coder is adjusted to 22.8 kbit/s in full-rate traffic channel or, respectively, to 11.4 kbit/s in half-rate traffic channel.

Thus, all traditional GSM codecs operate with fixed partitioning between speech and channel coding bit rates, regardless of the quality of the channel. These bit rates never change unless a traffic channel change takes place, which furthermore is a slow process. Consequently, this rather inflexible approach in view of desirable speech quality, on one hand, and system capacity optimisation, on the other hand have led to the development of the AMR codec (Adaptive Multi-Rate).

AMR codec adapts the partitioning between speech and channel coding bit rates according to the quality of the channel, in order to deliver the best possible overall speech quality. The AMR speech coder consists of the multi-rate speech coder, a source controlled rate scheme including a voice activity detector and a comfort noise generation system, and an error concealment mechanism to combat the effects of transmission errors and lost packets. The multi-rate speech coder is a single integrated speech codec with eight source rates from 4.75 kbit/s to 12.2 kbit/s, and a low rate background noise encoding mode.

There are several performance criteria set for the codecs used, for instance, in the GSM system, which performance can be measured by e.g. the frame erasure ratio (FER), bit error ratio (BER) or the residual bit error ratio (RBER) of the received data on any traffic channel TCH. Furthermore, to enable to automate the measurement of the performance, there has been developed a set of testing loops. A set of predefined testing loops are implemented into the mobile station connected to a system simulator. The system simulator activates a specific test loop and starts to supply either random or predefined test data into the codec. The mobile station loops back to the system simulator the data obtained after performing channel decoding. The system simulator is then able to compare the looped back data to the sent data. This way, the performance of the channel decoder part of the codec, for example, can be measured in regard to several criteria.

The problem involved with the arrangement described above is that these testing loops are designed to be particularly suitable for the previous GSM codecs. The AMR codec, however, includes features which are not involved in the previous codecs and, therefore, all the features of the AMR codec cannot be tested by using the known testing loops.

BRIEF DESCRIPTION OF THE INVENTION

The object of the invention is thus to provide an improved method and an apparatus implementing the method to avoid at least some of the above problems. The objects of the invention are achieved by a method and an apparatus, which are characterized in what is said in the independent claims. The preferred embodiments of the invention are disclosed in the dependent claims.

The invention is based on the idea that when the performance of decoding is determined in a telecommunication system, which comprises a decoder and a testing apparatus for supplying test data to the decoder, the measurement is started by generating a test data in the testing apparatus, which test data comprises speech parameters and an inband data field, which are channel encoded in a frame format, preferably speech frame format, which is then transmitted to the decoder for decoding. The decoder extracts at least a part of the inband data field from the decoded test data and transmits at least the part of the inband data field back to the testing apparatus, whereby no speech parameters of any other data is transmitted. Then the performance of decoding is determined by comparing the transmitted inband data field and the received inband data field in the test apparatus.

An advantage of the method and the apparatus according to the invention is that the performance of the inband decoder can also be measured. Another advantage of the invention is that because only inband data is looped back from the decoder, implementation problems relating to different uplink and downlink speech codec bit rates are reduced. A further advantage of the invention is that the existing testing apparatus can be utilized with only minor modifications.

BRIEF DESCRIPTION OF THE DRAWINGS

In the following, the invention will be described in greater detail in connection with preferred embodiments and with reference to the attached drawings in which.

DETAILED DESCRIPTION OF THE INVENTION

The invention will be described in the following more in detail, using the GSM system as a preferred platform for the embodiments of the invention. The invention is, however, not limited to the GSM system only, but it can be utilized in any corresponding system where the implementation of test loops counters similar problems. Therefore, the invention can be applied, for example, to the WCDMA (Wideband Code Division Multiple Access) systems, wherein the AMR (Adaptive Multi-rate) codec is also supported.

Figure 1:
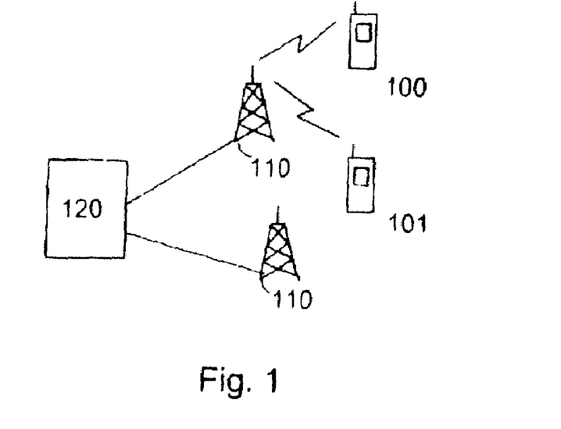
FIG. 1 shows a radio system which uses the method of the invention.

FIG. 1 shows an example of a wireless radio system, some parts of which utilizing the method of the invention. The presented cellular radio system comprises a base station controller 120, base transceiver stations 110 and a set of subscriber terminals 100, 101. The base transceiver stations 110 and subscriber terminals act as transceivers in the cellular radio system. The subscriber terminals establish a connection to each other by means of signals propagated through the base transceiver station 110. A subscriber terminal 100 can be a mobile phone, for instance. The radio system presented in FIG. 1 can for instance be a GSM system and the TDMA multiple access method, for instance, can be used in the radio system.

In the GSM system, there are several logical channels, which are transported on the grid of the physical channels. Each logical channel performs a specific task. Logical channels can be divided into 2 categories: the traffic channels (TCHs) and the control channels (CCHs). GSM speech traffic channels are TCH/FS (Full Rate Speech Channel), TCH/HS (Half-Rate Speech Channel), TCH/EFS (EFR Speech Channel), TCH/AFS (AMR Speech on FR Channel) and TCH/AHS (AMR Speech on HR Channel). Furthermore, there are several control channels defined in GSM, most of them being used to set-up a call and for synchronization. However, SACCH (Slow Associated Control Channel), FACCH (Fast Associated Control Channel) and RATSCCH (Robust AMR Traffic Synchronized Control Channel) channels are involved while an AMR call is active. Both SACCH and FACCH are used for transmission of signalling data during a connection, but there is one SACCH time slot allocated in every $26^{th}$ TDMA frame, whereas FACCH channel is used only if necessary. Also RATSCCH, which is used for modifying the AMR configurations on the radio interface during a connection, is used only if necessary. When FACCH or RATSCCH are needed, they are allocated the necessary time slots by "stealing" them from TCH speech frames.

In traditional GSM speech coding, speech codecs have had a fixed rate. There has been three speech codecs in use in the GSM system: the full-rate (FR) speech codec, based on RPE-LTP method (Regular Pulse Excited—Long Term Prediction), the half-rate (HR) speech codes, based on CELPNCELP method (Codebook Excited Linear Prediction) and the enhanced full-rate (EFR) speech codec, based on ACELP method (Algebraic Codebook Excited Linear Prediction). Speech codecs deliver speech parameters to channel codes every 20 ms. Since the active call logical channel mapping last 120 ms, it contains 6 speech frames. Both in the full-rate traffic channel (TCH/FS) and in the full-rate traffic channel using enhanced coding (TCH/EFS), a new speech frame is sent every $4^{th}$ burst containing TCH information. For every 20 ms speech frame, the full-rate speech codec FR delivers 260 bits and the enhanced full-rate speech codec EFR delivers 244 bits representing encoded speech parameters, resulting in the output bit rate of 13 kbit/s and 12.2 kbit/s, respectively. In the half rate traffic channel (TCH/HS), a new speech frame is sent every $2^{nd}$ burst containing TCH information. For every 20 ms speech frame, the half-rate speech codec HR delivers 112 bits representing encoded speech parameters, resulting in the output bit rate of 5.6 kbit/s.

These output bits representing the encoded speech parameters are fed into the channel coder. The channel coding is the set of functions responsible for adding redundancy to the information sequence. The coding is usually performed on a fixed number of input bits. Higher coding gains are achieved by increasing the complexity of the coding. However transmission delay and limited hardware resources limits the complexity that can be used in real time environment.

Figure 2:
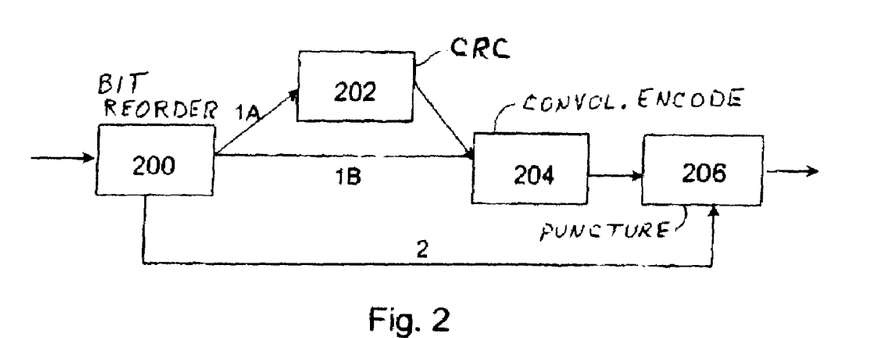
FIG. 2 shows the general structure of the channel encoding chain in the encoder.

In the following, a reference is made to FIG. 2, which illustrates the channel encoding chain in the encoder. The channel encoding of speech parameters consist of several blocks. Bit reordering (200) is performed to the bits of the speech parameters according to subjective importance, dividing the bits into categories 1A, 1B and 2. For the most important bits, i.e. class 1A bits, a CRC (Cyclic Redundancy Check, 202) is computed. The CRC technique transmit few additional bits that can be used by the receiver to detect errors in the transmitted frame. Class 1B bits are not protected by CRC. Both class 1A and 1b bits are protected by convolutional encoding (204), which is a method to add redundancy to the bits transmitted in the channel. The convolutional encoder produce more output bits than input inputs. The way redundancy is added allows the receiver to perform a maximum likelihood algorithm on the convolutionally encoded bits in order to allow the correction of signal errors introduced during transmission. The number of bits that can be sent in the channel is limited. Puncturing (206) is a method to reduce the number of bits sent on the channel by deleting bits from the convolutionally encoded data. The decoder knows which bits are punctured and adds placeholders for those. In FR channel, 456 bits per 20 ms can be sent, resulting in the gross rate of 22.8 kbit/s in full-rate traffic channel. Respectively, in HR channel, 228 bits per 20 ms can be sent, resulting in the gross rate of 11.4 kbit/s, which is exactly half the gross rate of that used in full-rate traffic channel.

As described above, all previous GSM codecs operate with fixed partitioning between speech and channel coding bit rates, regardless of the quality of the channel. These bit rates never change unless a traffic channel change (from FR to HR or vice versa) takes place, which besides is a slow process requiring layer 3 (L3) signalling. This fixed partitioning does not use the fact that the protection provided by channel coding is highly dependant on the channel conditions. When channel conditions are good, a lower channel coding bit rate could be used, allowing an higher bit rate for speech codec. Therefore, allowing a dynamic partitioning between speech and channel coding bit rate would increase the overall speech quality. The development of this idea led to the standardization of the AMR codec.

AMR codec adapts the error protection level to the radio channel and traffic conditions so that it always aims to select the optimum channel and codec mode (speech and channel bit rates) to achieve the best overall speech quality. The AMR codec operates in either the GSM FR or HR channel and it also provides the user with speech quality comparable to wire-line for the half-rate channel in good channel conditions.

The AMR speech coder consists of the multi-rate speech coder, a source controlled rate scheme including a voice activity detector and a comfort noise generation system, and an error concealment mechanism to combat the effects of transmission errors and lost packets. The multi-rate speech coder is a single integrated speech codec with eight source rates from 4.75 kbit/s to 12.2 kbit/s, and a low rate background noise encoding mode. The speech coder is capable of switching its bit-rate every 20 ms speech frame upon command.

The AMR codec contains eight speech codecs with bit-rates of 12.2, 10.2, 7.95, 7.4, 6.7, 5.9, 5.15 and 4.75 kbit/s. All the speech codecs are defined for the full-rate channel, while the six lowest ones are defined for the half-rate channel, as shown in the following table.

|  | 12.2 | 10.2 | 7.95 | 7.4 | 6.7 | 5.9 | 5.15 | 4.75 |
| --- | --- | --- | --- | --- | --- | --- | --- | --- |
| TCH/AFS | X | X | X | X | X | X | X | X |
| TCH/AHS |  |  | X | X | X | X | X | X |

A mobile station must implement all the codec modes. However, the network can support any combination of them. For AMR, codec mode selection is done from a set of codec modes (ACS, Active Codec Set), which set may include 1–4 AMR codec modes. This set can be reconfigured at call setup phase, in handover situation or by RATSCCH signalling. Each codec mode provides a different level of error protection through a different distribution between speech and channel coding. All the speech codec modes are allowed to change without the intervention of L3 signalling, enabling fast transition between mode, when channel conditions are varying.

Figure 3:
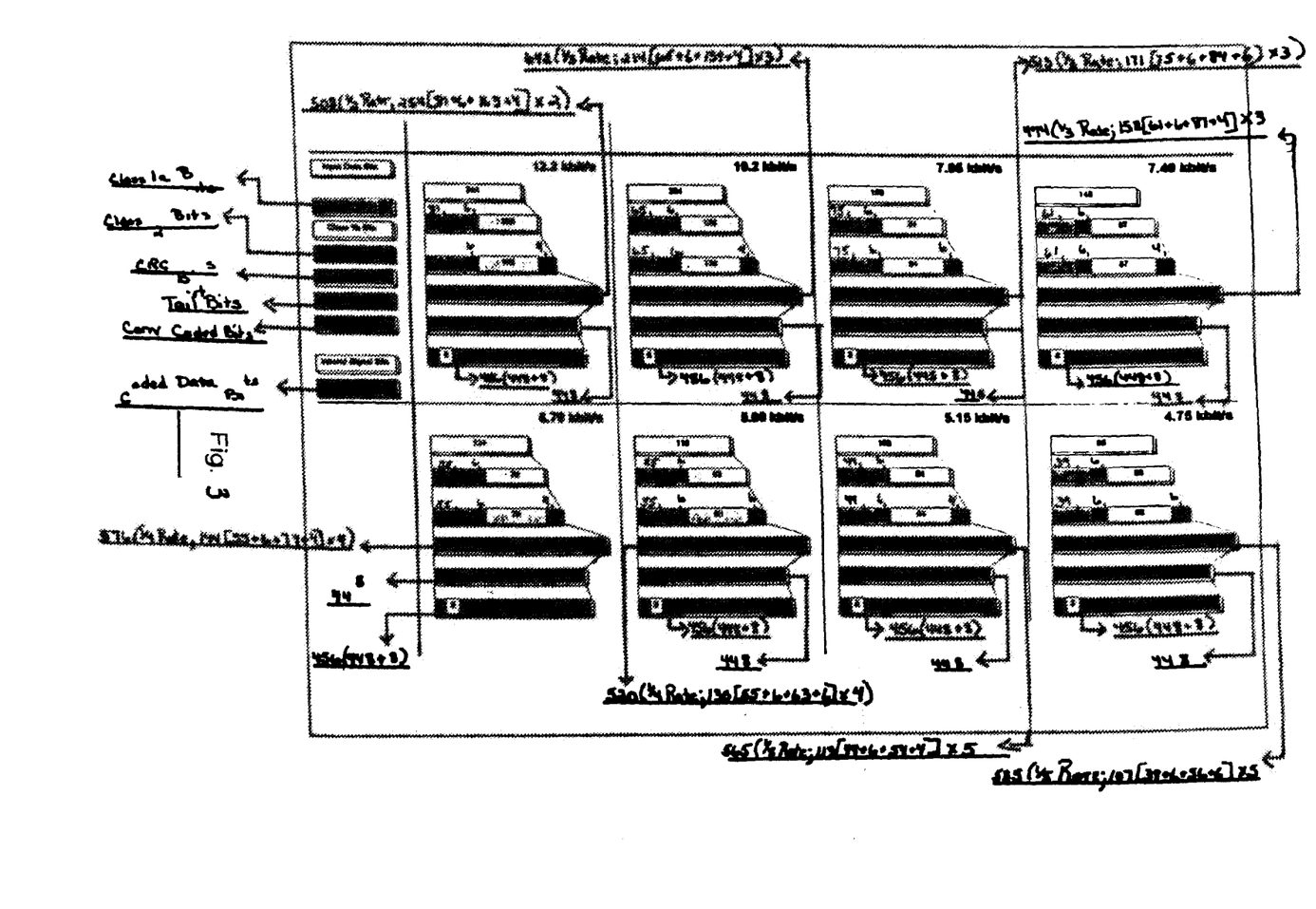
FIG. 3 illustrates the formation of TCH/AFS frames for different codec modes.

FIG. 3 illustrates the formation of TCH/AFS frames for different codec modes. Using for example the 12.2 kbit/s case, the frame is built starting from the 244 bits output by the speech codec. The speech frame bits are reordered and divided into class 1A (81 bits) and 1B (163 bits). For the protection of the 81 class 1A bits a 6 bit CRC is computed. 4 tail bits are added to the block of 250 bits, which tail bits are used for termination of the channel coder. ½ rate convolutional encoding is performed over the block of 254 bits (244+6+4), resulting in a block of 508 bits. The block of 508 bits is then punctured, thus reducing the number of bits to 448 bits. Finally, 8 bits containing inband data are added. The final block of data is 456 bits long.

As shown in FIG. 3, all the TCH/AFS channel encoded frames have the same length (456 bits) even though the number of bits in the input (the speech parameters) differs from mode to mode. The different number of input bits are encoded to exactly 456 output bits by altering the convolutional coding rate and the puncturing rate for each mode. 456 bits sent per every 20 ms, resulting in the gross rate of 22.8 kbit/s, make use of all the bits available from the full-rate traffic channel of the GSM system.

Figure 4:
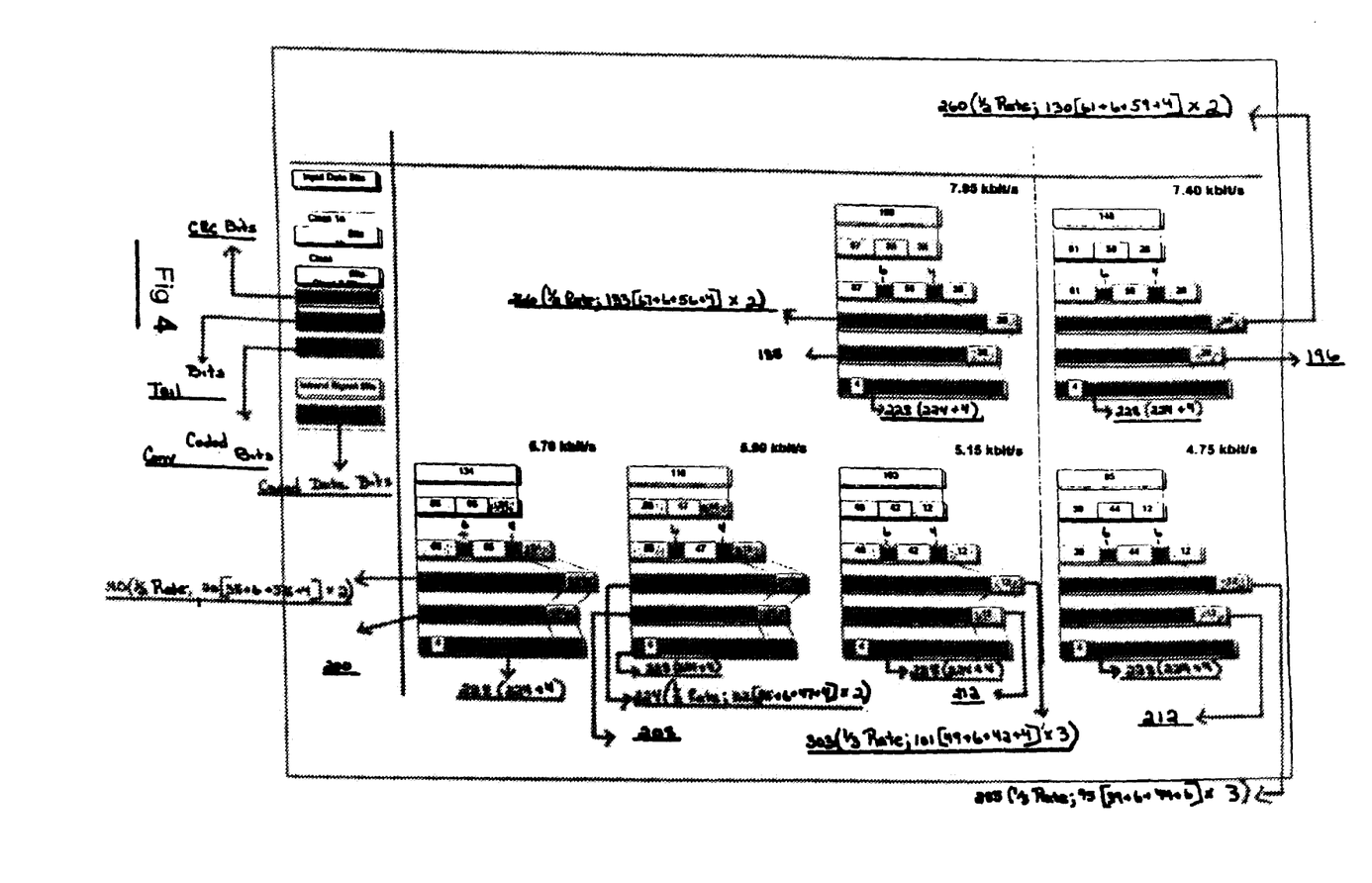
FIG. 4 illustrates the formation of TCH/AHS frames for different codec modes.

Respectively, FIG. 4 demonstrates the formation of TCH/AHS frames for the six different codec modes. The principle of frame building is similar to the case of TCH/AFS frames, with a few exceptions. In bit reordering, the bits are divided into class 1A, 1B and 2 bits, while in TCH/AFS frames only classes 1A and 1B are used. These class 2 bits are not convolutionally encoded. Furthermore, only 4 inband data bits are added to the convolutionally coded frame. In all TCH/AHS codec modes, the channel encoded frames are 228 bits long. 228 bits sent per 20 ms, resulting in the gross rate of 11.4 kbit/s, fulfills the requirements of the GSM system for the half-rate traffic channel.

As described earlier, there is 8 speech codec modes defined for the AMR and the AMR codec can be used on both existing FR and HR channels. Therefore, there are 14 different codec modes defined (8 for TCH/AFS channel, 6 for TCH/AHS channel) for the AMR.

The link adaptation process bears responsibility for measuring the channel quality. Depending on the quality and possible network constraints (e.g., network load), mode adaptation selects the optimal speech and channel codecs. The mobile station (MS) and the base transceiver station (BTS) both perform channel quality estimation for their own receive path. Based on the channel quality measurements, the BTS sends to MS a Codec Mode Command (CMC, the mode to be used by MS in uplink) and the MS sends to BTS a Codec Mode Request (CMR, the mode requested to be used in downlink). This signalling is sent inband, along with the speech data. The codec mode in the uplink may be different from the one used in downlink, but the channel mode (full-rate or half-rate) must be the same. The inband signalling has been designed to allow fast adaptation to rapid channel variations.

The network controls the uplink and downlink codec modes and channel modes. The mobile station must obey the Codec Mode Command from the network, while the network may use any complementing information to determine downlink and uplink codecs mode.

In GSM system, for instance, channel coding algorithms are thoroughly specified. Instead of specifying the channel decoder algorithm, performance criteria are defined and have to be met by the MS. There are several performance criteria set for the channel codecs used in the GSM system, which performance can be measured by e.g. the frame erasure ratio (FER), the bit error ratio (BER) or the residual bit error ratio (RBER) of the received data on any traffic channel TCH. For the GSM system, the criteria is defined more precisely, for example, in the document "3GPP TS 05.05 V8.7.1, Digital cellular telecommunications system (Phase 2+); Radio transmission and reception". To facilitate the development and implementation of the channel codecs and to measure the performance of the receiver, a specific apparatus called system simulator (SS) has been defined, which can be used, for example, for type approval purposes. There has been developed a set of testing loops for measuring the performance of the channel decoder. A predefined testing loop is activated in a mobile station connected to the system simulator and the performance is measured in regard to several criteria. For the GSM system, these testing loops are defined more precisely in the document "GSM 04.14 ETSI TS 101 293 V8.1.0, Digital cellular telecommunications system (Phase 2+); Individual equipment type requirements and interworking; Special conformance testing function".

These testing loops are designed to be particularly suitable for the previous GSM codecs. The AMR codec, however, includes features which are not involved in the previous codecs and, therefore, all the features of the AMR codec cannot be tested by using the known testing loops. The present invention solves at least some of the problems involved in the AMR testing.

A problem is related to determining the performance of inband signalling decoding. As described above in FIGS. 3 and 4, the AMR encoded traffic channel frame always includes some control bits transmitted along with the speech bits. These bits are called inband signalling bits. The purpose of these bits is to enable the codec mode change without any further signalling frame. Because there is at maximum four modes in a modeset, only two bits are needed to code the inband information. To help the decoding in difficult channel condition, these two bits are mapped to longer bit pattern: 8 bits on TCH/AFS and 4 bits on TCH/AHS.

The information transmitted inband depends on the direction. In downlink direction (from BTS to MS), two different information are time multiplexed in two consecutive speech frames. In the first frame, a mode command MC is transmitted from the BTS to the MS, whereby the BTS commands the mode the MS must use in uplink. In the second frame, a mode indication MI is transmitted from the BTS to the MS, whereby the BTS informs the MS of the mode it uses in downlink. Also in uplink direction (from MS to BTS), two different information are time multiplexed in two consecutive speech frames. In the first frame, a mode request MR is transmitted from the MS to the BTS, whereby the MS requests the BTS to use a certain mode in downlink. In the second frame, a mode indication MI is transmitted from the MS to the BTS, whereby the MS informs the BTS of the mode it uses in uplink. The information transmitted inband is always time multiplexed, i.e. every other frame contains current mode, and every other frame contains commanded/requested mode.

When a 20 ms frame has been received by the MS, it is processed by the channel decoder. The output of the channel codec is the channel decoded speech parameters along with the information that was transmitted inband. If that information was a mode command (MC), the MS will modify the speech mode it uses in uplink according to the command, since MS must always obey to commanded mode (MC) from the BTS. This used uplink mode will be signalled to the BTS via the uplink mode indication transmitted inband.

Since the former traffic channel frames of the fixed rate channel codecs do not include any inband data, there are no existing testing methods to measure the performance of the inband decoder in all situations. If the inband decoder performance is tried to be measured with current test loops and testing equipment (system simulator SS), the MS would follow received mode command (MC) and change its uplink mode indication (MI) accordingly. It is then possible for the tester SS to compare the received MI against the previously sent MC. If both are similar, the inband decoder can be considered to have worked correctly. If they are different, it informs that MS did not decode correctly the MC coming from BTS. From these observations, the SS can calculate the performance of the inband decoder.

A problem arises when trying to assess the performance of the MI inband decoder. Downlink MI does not have direct influence on any uplink inband signalled information. As already seen, the uplink MI is directly influenced by the downlink MC. Of the two time multiplexed inband information, remains the mode request (MR). The mode request is generated by the mobile station link adaptation algorithm and is not directly modified by the downlink MI. Because of that, the SS cannot calculate the performance of the MI inband decoder.

From an incorrect decoding of downlink MI follows an incorrect decoding of speech parameters, the CRC check failing and the frame is then declared as bad. If the former testing loop is activated, the erroneously decoded speech parameters are looped back to the tester SS. It would be possible for SS to compare sent speech parameters to the looped back speech parameters to determine the performance of the MI inband decoder. However, the channel encoding of the inband bits is much stronger than the channel encoding of the speech parameters, therefore the decoding of speech parameters is more likely to fail than the decoding of inband parameters. Consequently, the measured performance would be the one of the decoder of speech parameters, not the one of the inband decoder.

A new internal test loop has been developed to overcome this problem. In the new test loop the link adaptation algorithm is bypassed and replaced by a function that loops back the received inband data. This is done regardless of the inband signalling phase. This leads to two possible situations: the received MC can be transmitted in uplink as MI, and the received MI is then looped back as MR. In the other possible situation the received MC can be transmitted in uplink as MR and received MI is looped back as MI. Since the aim of the loop is to calculate inband decoding performance, the speech parameters transmitted by the SS are not looped back from the MS, but they are encoded as zeros. Advantageously, this reduces implementation problems related to different uplink and downlink speech codec bit-rates. Only the inband signalling pattern, i.e. only inband bits, no speech parameters, is sent back to the SS and the performance of the inband decoder can advantageously be measured. From the received inband signalling pattern the frame error rate for the inband channel (TCH/AxS-INB FER), for example, can be determined.

Figure 5:
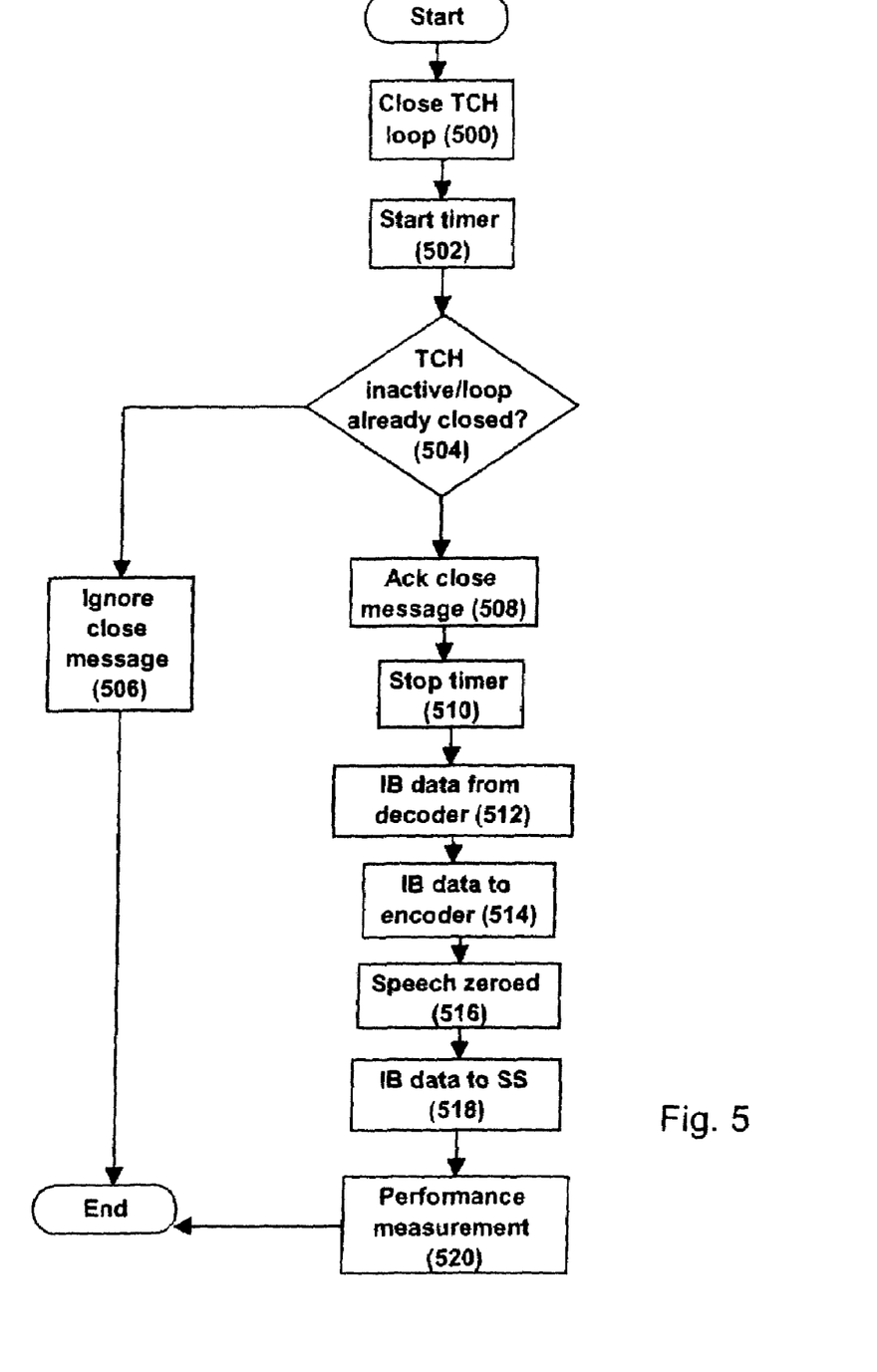
FIG. 5 shows a flow chart illustrating the new testing method according to invention.

The method according to the new testing loop is illustrated with a reference to the flow chart in FIG. 5. To establish a transparent testing loop for TCH frames, a TCH must be active between the SS and the MS. The TCH may be AMR speech over full-rate channel or half-rate channel of any rate specified in the GSM system. The testing loop is activated in an MS by transmitting an appropriate command message to the MS, which command can be, for example, a CLOSE_TCH_LOOP_CMD message according to the GSM system. The SS orders the MS to close its TCH loop by transmitting a CLOSE_TCH_LOOP_CMD message (500), specifying the TCH to be looped and that decoded inband signalling information are to be looped back by the MS. The SS then starts timer TTOI (502), which sets a time limit for the MS to response. If no TCH is active, or any test loop is already closed (504), the MS shall ignore any CLOSE_TCH_LOOP_CMD message (506). If a TCH is active, the MS shall close its TCH loop for the TCH specified and send back to the SS a CLOSE_TCH_LOOP_ACK (508). Upon reception of that message the SS stops timer TT01 (510).

After the MS has closed its TCH loop, every inband signal decision shall be taken from the output of the channel decoder (512) and input to the channel encoder (514). Transmitted speech parameters are not looped by setting the input frame to the channel encoder to zero's (516). The inband signal decisions input to the channel encoder are transmitted on the same TCH uplink to the SS (518). This is advantageously done regardless of the link adaptation, whereby the decoded inband information is directly looped back to the SS. The SS measures the performance of the inband decoder from the received inband signalling pattern (520), for example, by determining the frame error rate for the inband channel (TCH/AxS-INB FER).

The content of the CLOSE_TCH_LOOP_CMD message is defined more precisely in the above-mentioned document GSM 04.14. This message is only sent in the direction SS to MS. The CLOSE_TCH_LOOP_CMD message comprises four information elements: a protocol discriminator field and a skip indicator field, both having length of four bits and being defined more precisely in the document "GSM 04.07, v.7.3.0, sect. 11.1.1 and 11.1.2", a message type field having length of eight bits all defined as zeros and a sub-channel field having also length of eight bits. From the sub-channel field bits five bits have a specific meaning in defining the message content and they are called X, Y, Z, A and B bits. Three bits are spare bits set to zero.

The activation of the testing loop according to the invention can be implemented by means of the CLOSE_TCH_LOOP_CMD message, if one of the spare bits is advantageously also allocated a specific meaning in defining the message content. This new bit can be called, for example, a C bit. Then defining the C bit having value one, a new message content can be defined by a particular bit combination. For example, the following bit combination could be defined: A=1, B=0 and C=1, meaning that if the looped TCH is a TCH/AxS, then decoded inband signalling information is to be looped back. The value of X bit indicates whether there is only one full-rate channel active or which one of the possibly available sub-channels is used. The values of Y and Z bits can be discarded.

According to a second embodiment of the invention, the test sequence of the inband data modes, which the SS will use, is delivered to the MS. The delivery can take place either before the activation of the test loop or during the test set-up. The SS activates the test loop in the MS, for example by sending the CLOSE_TCH_LOOP_CMD message, and starts to transmit said test sequence. In the MS, there is implemented a counter, which will be incremented every time when the decoded inband data does not correspond with the expected result. When the test sequence is completely looped, the value of the counter can be either checked from the MS or it can be transmitted to the SS, from which value the performance of the inband decoder can be derived.

According to a third embodiment of the invention, the link adaptation algorithm is remained in active state and the MS follows the mode commands MC sent by the SS. Then only the mode indications MI according to the commanded mode MC are transmitted back to the SS. The speech parameters transmitted by the SS are not looped back from the MS, but they are encoded as zeros. The SS compares the received mode indication MI to the sent mode command MC and if they correspond, the mode command MC decoding can advantageously be measured. However, because only every second frame will be tested the SS, the performance of mode indication MI decoding must be measured by a separate test loop.

Figure 6:
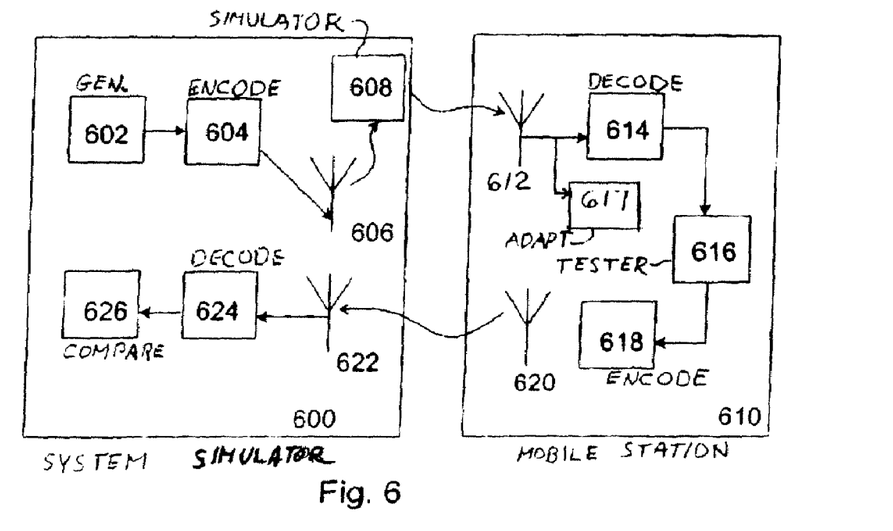
FIG. 6 shows a block chart illustrating the testing apparatus implementing the method according to invention.

The block chart of FIG. 6 illustrates an apparatus which can be applied in testing configuration according to the invention. The system simulator 600 comprises a generator 602 for generating random constant speech parameter patterns, which are then input to a channel encoder 604 for encoding. The channel encoded speech frames are then supplied to a transmitting means 606 for transmitting further via a channel simulator 608 to the mobile station 610. The mobile station 610 comprises a receiving means 612 for receiving the transmission, from which the channel encoded speech frames are input to the channel decoder 614. The mobile station 610 comprises means 616 for implementing test loops and for executing a specific test loop according to the instructions given by the system simulator 600. The testimplementing means (TESTER) 616 can operate by bypassing the link adaptation process. This is indicated in FIG. 6 by placing the inband mode-command signals in block 617, whereby the inband modecommand signals are bypassed during the testing of a channel decoder. The test loop to be used can be defined, for example, by the CLOSE$_{13}$ TCHLOOP_CMD message, as described above. The output of the test loop is supplied to the channel encoder 618 for encoding. The channel encoded data is then supplied to a transmitting means 620 for transmitting further to the system simulator 600. The system simulator 600 also comprises a receiving means 622 for receiving the transmission, from which the channel encoded data is input to the channel decoder 624. The system simulator 600 comprises comparing means 626 for comparing the received data to the sent pattern and as a result of said comparison, the performance of the decoding can be measured.

For a man skilled in the art it is obvious that in the course of technical progress, the basic idea of the invention can be carried out in numerous ways. Thus, the invention and its embodiments are not limited by the previous examples but they may vary within the scope of the appended claims.

The invention claimed is:

1. A method for determining the performance of decoding in a telecommunication system comprising a decoder and a testing apparatus for supplying test data to the decoder, the method comprising:
generating the test data comprising channel coded parameters and inband data,
transmitting the test data from the testing apparatus to the decoder for decoding, extracting at least a part of the inband data from the decoded test data,
bypassing a link adaptation process of the decoder, wherein the link adaptation process measures channel quality for selection of a channel codec in the telecommunication system,
transmitting at least the part of the inband data back to the testing apparatus, and
determining the performance of said decoding by comparing the transmitted inband data and the at least the part of the inband data received in the test apparatus.

2. A method according to claim 1, further comprising
activating a traffic channel of the telecommunication system before transmitting the test data, and
transmitting the test data from the testing apparatus to the decoder in a downlink traffic channel and from the decoder to the testing apparatus in an uplink traffic channel.

3. A method according to claim 2, further comprising
transmitting the inband data back to the testing apparatus in a first available uplink traffic channel time frame.

4. A method according to claim 2, further comprising
transmitting, prior to transmitting the test data, a message from the testing apparatus to activate a test loop in tne decoder, wherein said test loop is implemented in functional connection with the decoder, and
acknowledging said message from the decoder to the testing apparatus, in response to the traffic channel being activated.

5. A method according to claim 4, wherein
the message is a bit combination of CLOSE_TCH$_{13}$ LOOP$_{13}$ CMD message defined in the document GSM 04.14 V8.1.0 of GSM system.

6. A method according to claim 1, wherein
the channel coded parameters are speech parameters.

7. A method according to claim 1, further comprising
determining the performance of channel decoding of mode indication (MI) inband data field in AMR (Adaptive Multi-Rate) full-rate or half-rate speech channel.

8. A method according to claim 1, wherein said part of the inband data is determined in said generating of the test data, and said bypassing enables said codec to operate in response to said test data independently of a measured channel quality.

9. A testing apparatus for determining the performance of a decoder, which the testing apparatus is arranged to be runctionally connected to the decoder, the testing apparatus comprising:
a composing means for composing test data comprising channel coded parameters and inband data,
a transmitter for transmitting the test data to the decoder for decoding,
controlling means for sending a command to the decoder to bypass its link adaptation process, wherein the link adaptation process measures channel quality of a telecommunication system for selection of a channel codec in the telecommunication system,
a receiver for receiving at least part of the inband data, and a comparator for determining the performance of said decoding by comparing the transmitted inband data and the at least the part of the inband data received in the testing apparatus.

10. A testing apparatus according to claim 9, wherein the testing apparatus is arranged to:

activate a traffic channel towards the decoder before transmitting the test data, transmit the test data to the decoder in a downlink traffic channel, and receive the test data from the decoder in an uplink traffic channel.

11. A testing apparatus according to claim 10, wherein the testing apparatus is arranged to:

transmit, prior to transmitting the test data, a message to the decoder to activate a test loop in the decoder, wherein the test loop is implemented in functional connection with the decoder, and receive an acknowledgement of said message from the decoder, in response to the traffic channel being activated.

12. A mobile station, comprising:

a receiver for receiving test data comprising channel coded parameters and inband data from a testing apparatus, a decoder for decoding the test data, extracting means for extracting at least part of the inband data from the decoded test data, controlling means for controlling a link adaptation process of the decoder to be bypassed, wherein the link adaptation process measures channel quality of a telecommunication system for selection of a channel codec in the telecommunication system, and a transmitter for transmitting the at least part of the inband data back to the testing apparatus.

13. A mobile station according to claim 12, wherein the inband data is arranged to be transmitted back to the testing apparatus in a first available uplink traffic channel time frame.

* * * * *

UNITED STATES PATENT AND TRADEMARK OFFICE
CERTIFICATE OF CORRECTION

PATENT NO. : 7,227,888 B2  Page 1 of 1
APPLICATION NO. : 10/099627
DATED : June 5, 2007
INVENTOR(S) : Lemieux It is certified that error appears in the above-identified patent and that said Letters Patent is hereby corrected as shown below:

In column 10, line 32, in claim 4, delete "in tne" and insert -- in the --, therefor.

In column 10, lines 39-40, in claim 5, delete "CLOSE_TCH$_{13}$ LOOP$_{13}$ CMD" and insert -- CLOSE_TCH_LOOP_CMD --, therefor.

In column 10, line 41, in claim 5, after "of" and insert -- a --.

In column 10, line 56, in claim 9, delete "runctionally" and insert -- functionally --, therefor.

Signed and Sealed this

Sixth Day of November, 2007

JON W. DUDAS
*Director of the United States Patent and Trademark Office*